United States Patent
Chiba

(10) Patent No.: US 8,084,908 B2
(45) Date of Patent: Dec. 27, 2011

(54) GENERATOR/MOTOR MOUNTED AS AN AUXILIARY POWER UNIT OF AN ENGINE

(75) Inventor: Teiichirou Chiba, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 595 days.

(21) Appl. No.: 11/920,025

(22) PCT Filed: May 9, 2006

(86) PCT No.: PCT/JP2006/309324
§ 371 (c)(1),
(2), (4) Date: Mar. 11, 2009

(87) PCT Pub. No.: WO2006/121045
PCT Pub. Date: Nov. 16, 2006

(65) Prior Publication Data
US 2009/0302720 A1 Dec. 10, 2009

(30) Foreign Application Priority Data

May 10, 2005 (JP) .................. 2005-137808

(51) Int. Cl.
*H02K 49/00* (2006.01)
*H02K 7/10* (2006.01)
*H02K 47/00* (2006.01)
*H02K 1/00* (2006.01)

(52) U.S. Cl. .................. 310/102 R; 310/75 R; 310/113; 310/193

(58) Field of Classification Search ................ 310/67 R, 310/75 R, 90, 102 R, 113, 193; 903/906, 903/917, 951; 180/65.26
See application file for complete search history.

(56) References Cited

U.S. PATENT DOCUMENTS

| 2,908,189 | A | * | 10/1959 | Chapman et al. ................ 475/2 |
| 5,952,746 | A | | 9/1999 | Mittmann et al. |
| 6,092,985 | A | | 7/2000 | Winkam |
| 6,253,437 | B1 | | 7/2001 | Levin |
| 6,478,101 | B1 | | 11/2002 | Taniguchi et al. |
| 6,561,336 | B1 | | 5/2003 | Huart et al. |
| 2005/0039572 | A1 | * | 2/2005 | Friedmann ...................... 74/661 |

FOREIGN PATENT DOCUMENTS

DE 19721528 A1 11/1998
(Continued)

OTHER PUBLICATIONS

Supplementary European Search Report mailed Dec. 13, 2010 issued in European Patent No. 1 885 046, 3 pages.

*Primary Examiner* — Quyen Leung
*Assistant Examiner* — Jose Gonzalez Quinones
(74) *Attorney, Agent, or Firm* — Fish & Richardson P.C.

(57) ABSTRACT

A generator/motor includes a ring-shaped stator core (20) fixed to a motor housing (10), and a motor rotor (30). The motor rotor (30) includes a ring-shaped rotor yoke (35) which rotates in cooperation with the crankshaft (1) and which is opposed to an inner peripheral surface of the stator core (20) with a predetermined gap therebetween. The motor rotor (30) also includes a rotor flange (31) which fixes and supports the rotor yoke (35) at its outer peripheral surface. The rotor flange (31) is rotatably supported by a support member (51*a*) of the motor housing (10) through a bearing (60). A cylindrical shaft portion (40) is interposed between the crankshaft (1) and the motor rotor (30), and the crankshaft (1) is spline coupled to the cylindrical shaft portion (40).

8 Claims, 15 Drawing Sheets

FOREIGN PATENT DOCUMENTS

| | | |
|---|---|---|
| DE | 10007262 A1 | 9/2000 |
| EP | 0 913 601 A1 | 5/1999 |
| JP | 7-241050 | 9/1995 |
| JP | 2000-356148 | 12/2000 |
| JP | 2003-205756 | 7/2003 |
| JP | 2003-235208 | 8/2003 |

* cited by examiner

PRIOR ART FIG. 15

GENERATOR/MOTOR MOUNTED AS AN AUXILIARY POWER UNIT OF AN ENGINE

TECHNICAL FIELD

The present invention relates to a generator/motor which is mounted in an automobile or construction equipment and which is suitable as an auxiliary power unit of a hybrid engine.

BACKGROUND ART

In some commercially available vehicles including passenger cars, buses and trucks, a generator/motor has already been mounted in a flywheel of a hybrid engine thereof. As a hybrid power unit, an engine may be provided with a PTO and a special power generator may be mounted, but if a flywheel and a generator/motor are integrally formed, there are merits that two functions are commonly used, the number of parts is reduced, and a vehicle space for mounting the power generator may be small. Thus, in this specification, a flywheel which is integrally fixed to a crankshaft is handled as one of constituent members of the generator/motor.

Since the flywheel is directly connected to a crankshaft, if a motor rotor is fixed to the flywheel, a surface and a core of the flywheel vibrate, the rotation precision of the motor rotor is deteriorated, and it becomes extremely difficult to manage an air gap between a stator core and a magnetic pole. To solve these problems, it is preferable to have a bearing structure for a motor after through a dumper, but since it is necessary that the flywheel is compact in its axial direction, structures of the dumper and a bearing, and a fixing method of the stator core are variously improved. If the air gap between a motor rotor and a magnetic pole of the stator core is increased extremely, even if the surface and the core of the flywheel vibrate, this does not affect a magnetic circuit of the motor. However, if the air gap is increased in this manner, the output of the motor is reduced and the power generating efficiency is also deteriorated.

For example, Japanese Patent Application Laid-open No. H7-241050 (patent document 1) proposes to manage an air gap between the magnetic pole of the stator core and the motor rotor by adjusting a position of the stator. According to the patent document 1, as shown in FIG. 15, a stator core 120 is disposed along an inner peripheral surface of a flywheel housing 110. The stator core 120 is fixed to and supported by a stator ring which is fixed to the flywheel housing 110. A plurality of gap adjusting bolts 111 are screwed at equal pitches in the flywheel housing 110 at its circumferential positions where the stator core 120 is disposed. An outer peripheral surface of the stator core 120 is pushed each other by adjusting a projecting amount of the gap adjusting bolts 111 from the inner peripheral surface of the flywheel housing 110, the air gap between the magnetic pole of the stator core 120 and the motor rotor is adjusted, and when the gap is obtained precisely, the stator core 120 is temporarily jointed to the flywheel housing 110 through a stator ring by temporarily jointing bolts 112. Then, the stator ring is fixed to the flywheel housing 110 by means of fixing bolts 113.

If such a hybrid engine is employed, it is possible to enhance the environment such as energy-conservation, noise reduction and exhaust gas reduction. Therefore, in recent years, the time is now ripe to mount the hybrid engine also in engineering construction equipment. According to Japanese Patent Application Laid-open No. 2003-235208 (patent document 2), as shown in FIG. 16, a rotor magnet 131 is disposed on an outer peripheral surface or an inner peripheral surface of a flywheel 130 of an internal combustion engine E which drives a hydraulic pump P of construction equipment, a stator coil 132 is disposed on an inner peripheral surface of the flywheel housing 133, or on the flywheel housing 133 or an outer peripheral surface of a cylindrical machine frame having a flange mounted on an engine case such as to be opposed to the rotor magnet 131, thereby assembling an assisting motor/generator on an outer periphery or an inner periphery of the flywheel 130.

Patent Document 1: Japanese Patent Application Laid-open No. 7-241050
Patent Document 2: Japanese Patent Application Laid-open No. 2003-235208

DISCLOSURE OF INVENTION

Problem to be Solved by the Invention

According to the hybrid engine disclosed in the patent document 1, initial performance to some extent can be obtained immediately after the air gap between the motor rotor and the stator core is adjusted, but since the stator core which is a heavy object is positioned and held only by a tip end of the gap adjusting bolt, the stator core may be disengaged from the stator ring and fall in the axial direction because of long-term use or a point contact portions between the stator and the bolt may worn or sink upon reception of strong vibration especially in a vehicle-mounted state depending upon a fixing manner between the stator core and the stator ring, and it becomes difficult to hold the stator core due to deterioration with time. A flywheel to which a rotor yoke is directly fixed at its outer periphery is directly coupled to a crankshaft by a key. Therefore, the rotation precision of the rotor yoke is deteriorated due to vibration of the crankshaft or vibration of the surface or the core of the flywheel, and this makes it difficult to manage the air gap between the magnetic pole of the stator core.

According to the hybrid engine disclosed in the patent document 2 also, the rotor magnet is fixed to the outer periphery of the flywheel, and a center of the flywheel is directly fixed to the crankshaft. Therefore, vibration of the crankshaft and vibration of the surface or the core of the flywheel directly affect the rotation precision of the rotor magnet and thus, the air gap must be set large. Thus, the motor efficiency and the power generating efficiency are largely deteriorated. When an air gap is set to such a value that these efficiencies are not deteriorated, this will cause torque ripple or uneven power generation based on the deterioration in rotation precision.

The present invention has been developed to overcome the problems, and it is an object of the invention to provide a generator/motor of a hybrid engine capable of obtaining desired motor efficiency and power generating efficiency while securing air gap precision between a stator core and a motor rotor with a simple structure.

Means for Solving the Problem

The object can effectively be achieved by the main structure of the present invention, i.e., a generator/motor as an auxiliary power unit of an engine disposed between a crankshaft portion of the engine and a hydraulic pump or a transmission, comprising a ring-shaped stator core fixed to a motor housing, and a motor rotor including a ring-shaped rotor yoke which rotates in cooperation with a crankshaft and which is opposed to an inner peripheral surface of the stator core at a predetermined gap therebetween, a rotor flange which fixes and supports the rotor yoke, and a cylindrical shaft portion disposed at a center of the rotor flange, wherein the rotor flange is rotatably supported by a support portion of the motor housing through a bearing, a spline groove to be spline coupled to the crankshaft portion is formed on the cylindrical shaft portion of the motor rotor.

According to a preferred mode, the bearing is an annular ball bearing, and the ball bearing is fixed between a bearing support portion of the motor housing and a bearing support surface provided on the rotor yoke. It is preferable that the cylindrical shaft portion of the motor rotor is formed at its one end with a spline groove to be spline coupled to the crankshaft portion, and at its other end with a spline groove to be coupled to the hydraulic pump or the transmission. The cylindrical shaft portion of the motor rotor and the rotor flange may be separately provided, and they may be spline coupled to each other, or they may be integrally manufactured.

According to a more concrete mode, the cylindrical shaft portion includes first and second shaft bodies, the first shaft body is provided at its central portion with a first external tooth spline groove, and at its engine-side end with a first internal tooth spline groove which is spline coupled to one end of the second shaft body, and the second shaft body is provided at its one end with a third external tooth spline groove which is spline coupled to the first internal tooth spline groove of the first shaft body, and at its other end with the second external tooth spline groove which is spline coupled to the crankshaft portion.

A shaft end of the cylindrical shaft portion on the opposite side from the second external tooth spline has a second internal tooth spline groove which is spline coupled to an input shaft of the hydraulic pump or the transmission. The crankshaft portion includes a flywheel which is integrally fixed to the crankshaft, and the second external tooth spline of the cylindrical shaft portion is spline coupled to an internal tooth spline of the flywheel. The crankshaft portion includes a flywheel integrally fixed to the crankshaft and having a through hole at its central portion into which the second external tooth spline can loosely be inserted, and the second external tooth spline groove formed on an engine-side end of the cylindrical shaft portion is spline coupled directly to an internal tooth spline groove formed on the crankshaft of the crankshaft portion.

Effect of the Invention

According to the generator/motor of the hybrid engine according to the present invention, the motor rotor is rotatably supported by the support portion of the motor housing which is a rigid body through a bearing. As a result, surface vibration or core vibration is not generated in the rotation of the motor rotor. The cylindrical shaft portion is disposed between the motor rotor and the crankshaft portion of the engine so that the vibration of the crankshaft portion is not transmitted directly to the motor rotor. Especially, the cylindrical shaft portion and the crankshaft portion are spline coupled to each other. With such spline coupling, the machining precision can easily be adjusted depending upon design of the meshing tooth. In this invention, a fine clearance is provided in the spline coupling so that a free degree is given to the fitted portions. With this clearance, even if the crankshaft receives vibration of the engine and the core vibrates, the core vibration is attenuated through the cylindrical shaft portion, the rotation precision of the motor rotor is maintained for a long time, and the air gap between the stator core is maintained constant for a long term. As a result, the motor efficiency and the power generating efficiency of the generator/motor of the invention are not deteriorated.

In the invention, when a plurality of spline couplings is established through the cylindrical shaft portion, the respective spline coupled portions are independently formed with spline tooth. Thus, it is possible to prevent each spline coupled portion from receiving direct influence from each other, and power can be transmitted between the cylindrical shaft portion and the crankshaft portion and between the cylindrical shaft portion and the motor rotor with independent motion.

The crankshaft portion of the invention is a crankshaft itself of the engine but includes a flywheel which is integrally fixed to the crankshaft in some cases. The flywheel in this case enhances the rotation efficiency of the engine and rotation efficiency of the generator and thus, the flywheel functions as both the engine and the generator/motor. There are a case where the cylindrical shaft portion is independent from the motor rotor, a case where the cylindrical shaft portion exists alone, and a case where the cylindrical shaft portion includes first and second shaft bodies. The cylindrical shaft portion may be integral with the motor rotor. Depending upon the various combinations of the structures, there are a case where the cylindrical shaft portion and the crankshaft are directly spline coupled to each other, and a case where the cylindrical shaft portion and the flywheel are spline coupled to each other.

At any rate, in this invention, the motor rotor is rotatably supported by a portion of the motor housing which is a rigid body through a bearing, and they are spline coupled to each other at least between the motor rotor and the crankshaft portion through the cylindrical shaft portion. Therefore, vibration generated in the crankshaft portion with respect to the motor rotor, surface or core vibration of the flywheel can be suppressed to the utmost, and stable rotation precision can be obtained in the motor rotor.

Figure 1:
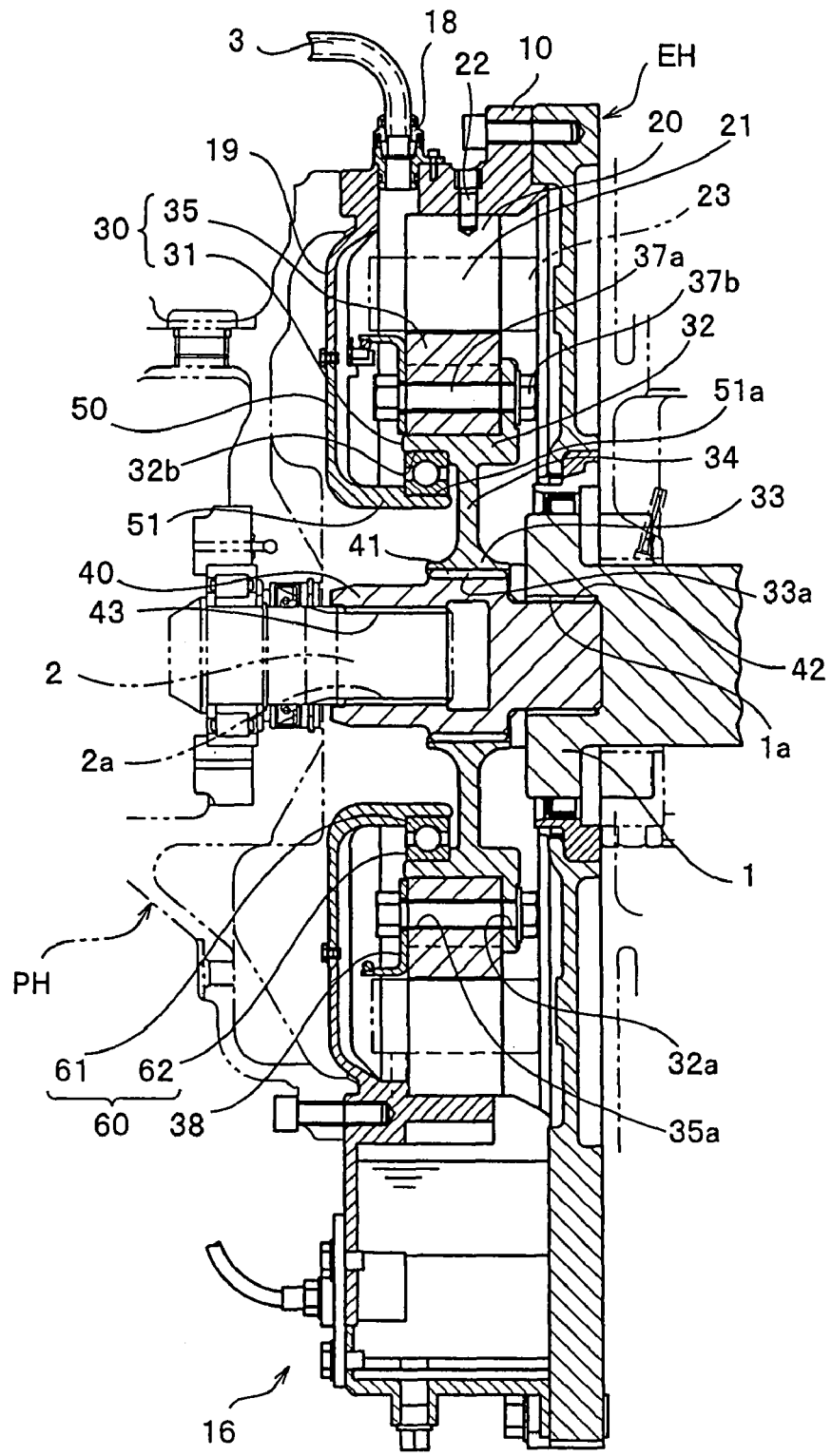
FIG. 1 is a vertical sectional view of a generator/motor mounted in a hybrid engine according to a first embodiment of the present invention.

EXPLANATION OF LETTERS OR NUMERALS 1 crankshaft
1a internal tooth spline
2 input shaft of hydraulic pump or transmission
2a external tooth spline
3 lead wire
10 motor housing
11 housing body
11a, 11b oil supply opening
12 frame
13 communication passage
14 closing member
16 oil reservoir
17 terminal connecting portion
18 connector
19 ring-shaped flange
20 stator core
21 projection
22 roll pin
23 coil
30 motor rotor
31 rotor flange
32 yoke support
32a, 35a bolt insertion hole
32b bearing support surface
33 spline coupled portion
33a spline tooth
34 annular disk
35 rotor yoke
36 inductor
37a bolt
37b nut
38 impeller
38a body
38b blade (projection)
38c bolt insertion hole
40 cylindrical shaft portion
41 first external tooth spline
42 second external tooth spline
43 first internal tooth spline
44 retainer having step
45 spring ring
46 fastening bolt
47 second internal tooth spline
48 third external tooth spline
50 bearing flange
51 bearing support member
51a bearing support surface
60 bearing
61 inner race
62 outer race
100 flywheel
101 internal tooth spline
102 bolt insertion hole
103 fastening bolt
104 starter ring gear
EH engine housing
PH pump housing

BEST MODE FOR CARRYING OUT THE INVENTION

Representative embodiments of the present invention will be explained concretely based on the drawings. FIG. 1 is a vertical sectional view taken along an axis of a generator/motor according to a first embodiment of the invention. FIGS. 2 to 9 are perspective views of main constituent members of the generator/motor. The generator/motor of the embodiment is mounted in a hybrid engine applied to a construction equipment such as a hydraulic shovel but can widely be applied to other automobile fields, general industrial machine fields or large engine such as shipping.

As can be understood from these drawings, main constituent members of the generator/motor in the illustrated embodiment are a motor housing 10, a ring-shaped stator core 20 fixed to an inner wall surface of the motor housing 10, a motor rotor 30 opposed to an inner peripheral surface of the stator core 20, a cylindrical shaft portion 40 as one of constituent members of the motor rotor 30 which is inserted through a center hole of the motor rotor 30 and rotates and supports the motor rotor 30, a bearing flange 50 which is fixed to a peripheral surface of the motor housing 10 on the opposite side from a later-described engine, and a bearing 60 interposed between a bearing support surface 51a of the bearing flange 50 and a bearing support surface 51a of the motor rotor 30. The motor rotor 30 includes an annular rotor flange 31, and a ring-shaped rotor yoke 35 which is tightly supported on an outer peripheral surface of the rotor flange 31. The cylindrical shaft portion 40 is inserted through the center hole of the rotor flange 31 and rotates and supports the rotor flange 31. The above-described constituent members are assembled into the motor housing 10 and then, an end of the motor housing 10 on the side of the engine is integrally fixed to an engine housing EH, and the hydraulic pump or an end thereof on the side of a transmission is integrally fixed to a pump housing PH.

Figure 2:
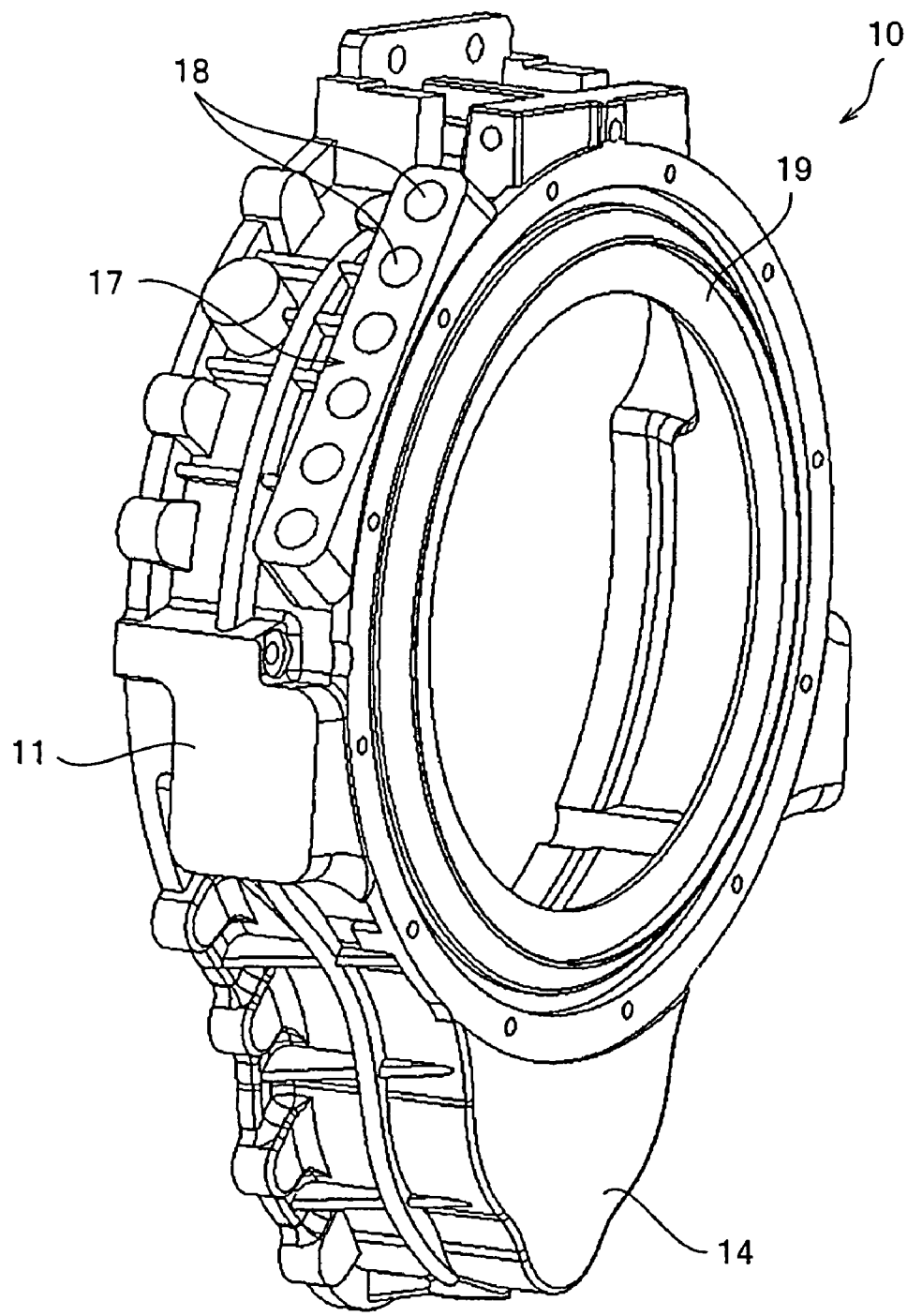
FIG. 2 is a perspective view of a motor housing which is one of constituent members of the generator/motor as viewed from a pump.
Figure 3:
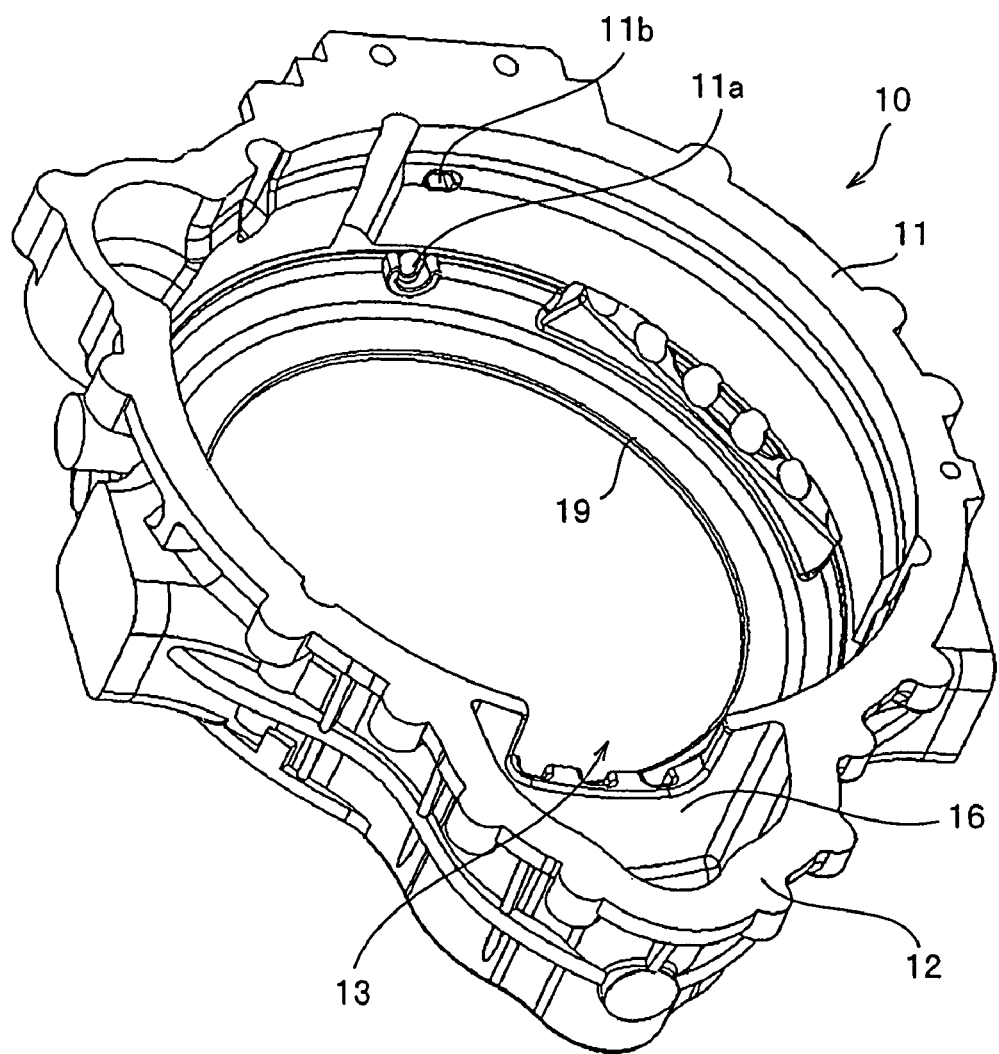
FIG. 3 is a perspective view of the motor housing as viewed from the engine.

As shown in FIGS. 2 and 3, in the motor housing 10, a housing body 11 is formed into a thin cylindrical shape as a whole, an isosceles triangular frame 12 is continuously formed on a lower end of the housing body 11. The lower end of the housing body 11 and the frame 12 are in communication with each other partially through a communication passage 13. An end surface of the frame 12 on the side of the engine is closed with an engine housing EH, an end surface of the frame 12 on the side of a hydraulic pump is closed with a closing member 14, and an oil reservoir 16 is formed therein. As shown in FIG. 3, oil is supplied through two oil supply openings 11a and 11b formed in an upper wall of the housing body 11, the oil flows downward in the housing and stored in the oil reservoir 16 and a lower portion of the motor housing 10. If the engine rotates, the engine rotates in a state where the constituent members disposed, in the generator/motor, especially an outer periphery of the motor rotor 30 comes into contact with an oil level stored in the lower portion of the motor housing 10, and the oil circulates through the motor housing 10 as the motor rotor 30 rotates. A coil 23 is wound around the stator core 20, and the coil 23 is partially immersed in the oil stored in the lower portion of the motor housing 10. In this embodiment, as shown in FIG. 2, a terminal connecting portion 17 is provided in a rear region of an upper peripheral surface of the motor housing 10. The terminal connecting portion 17 has six coil terminals connected to an inverter (not shown).

Figure 4:
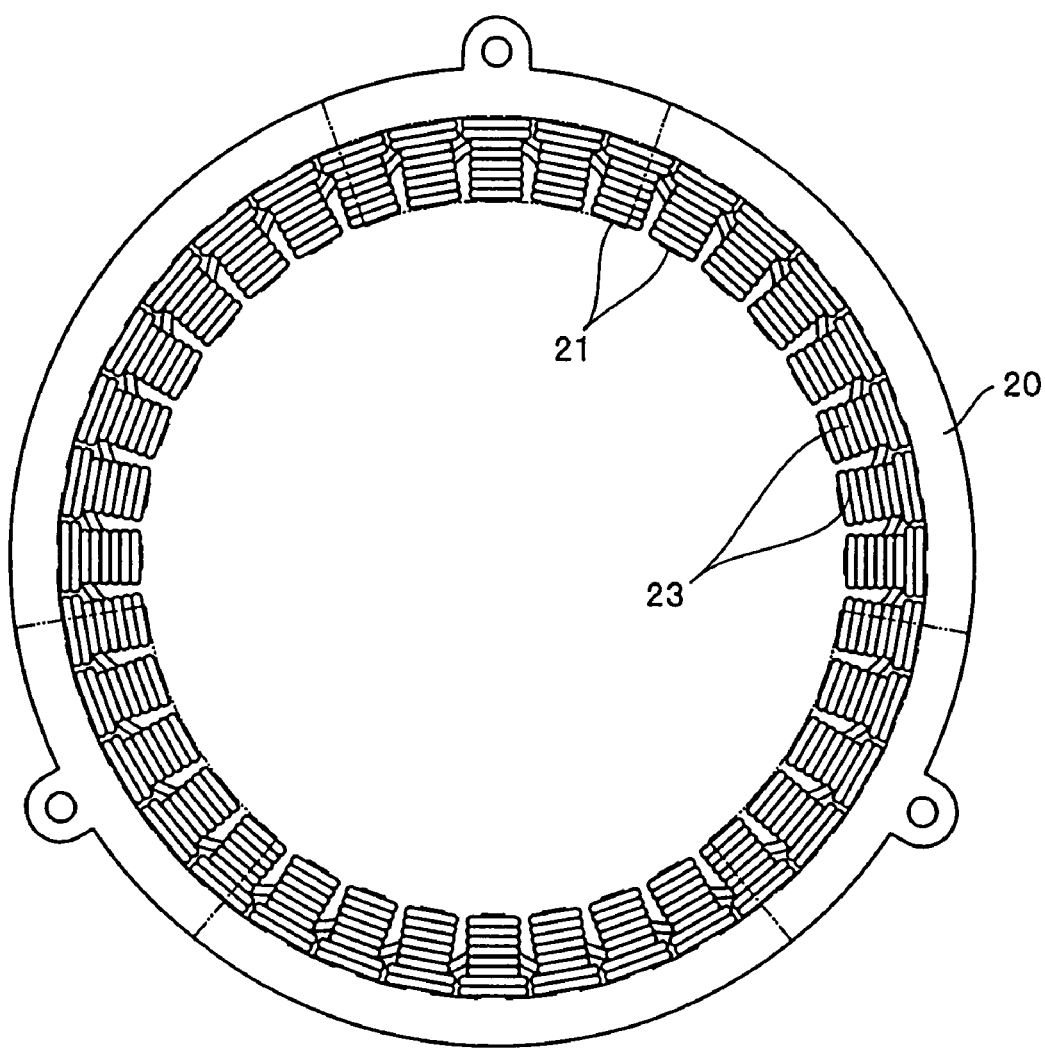
FIG. 4 is a plan view of the stator core around which a coil is wound which is one of the constituent members of the generator/motor as viewed from the pump.

As shown in FIG. 4, the stator core 20 comprises a ring-shaped member, and a large number of projections 21 as poles project from an inner peripheral surface of the stator core 20 toward its center in the circumferential direction at predetermined pitches. Three coils 23 are sequentially wound around a peripheral surface of each projection 21 by a normal method. In this embodiment, 36 projections 21 project, and they constitute a three-phase twelve-pole SR motor. As shown in FIG. 1, the stator core 20 is fixed to an inner peripheral surface of the housing body 11 through a roll pin 22. The six coil terminals are inserted through the terminal connecting portions 17 formed in the peripheral surface of the housing body 11. The coil terminal is connected to a terminal of a lead wire 3 extending from an external AC power supply through the connector 18 at the terminal connecting portion 17.

Figure 5:
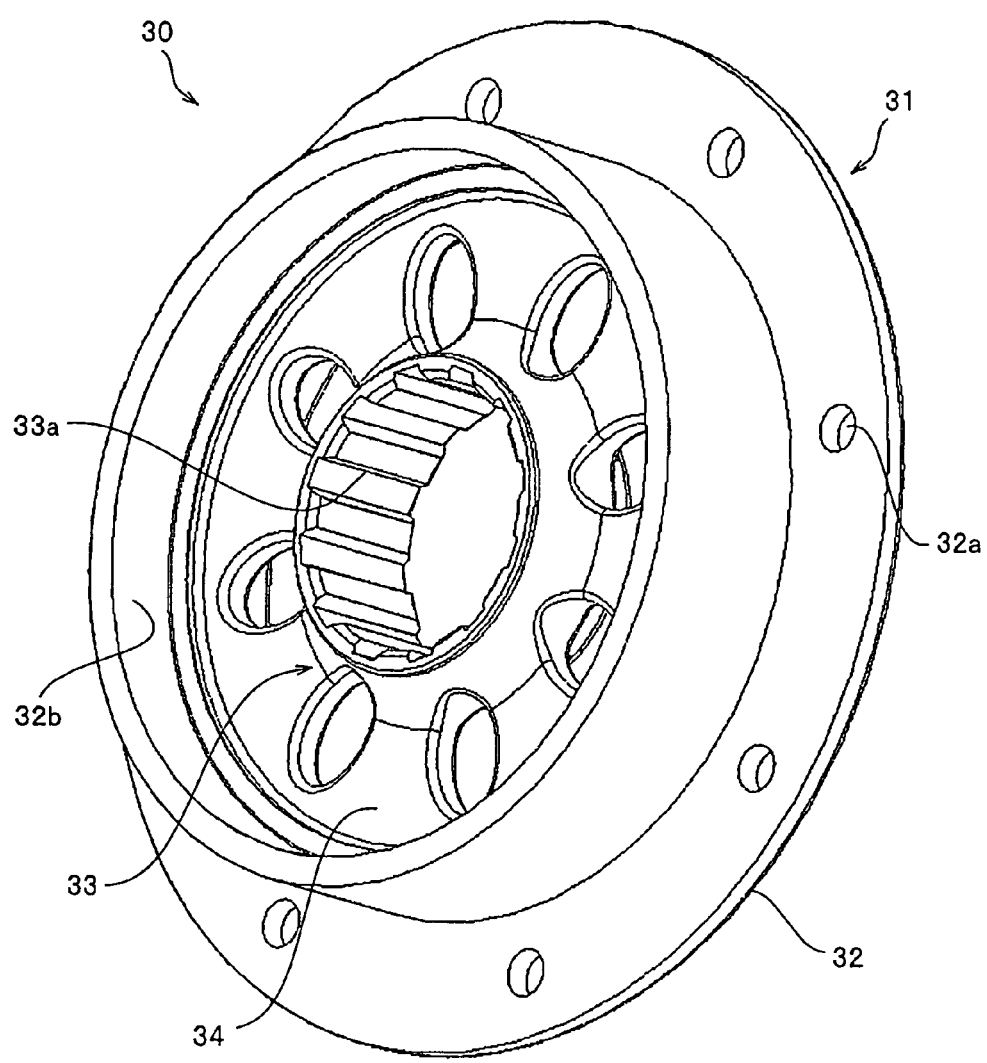
FIG. 5 is a perspective view of a rotor flange of the motor rotor which is one of the constituent members of the generator/motor as viewed from the pump.

The rotor flange 31 comprises an annular member. As shown in FIGS. 1 and 5, the rotor flange 31 is provided at its outer periphery with a yoke support 32 which fixes and supports the rotor yoke 35. The rotor flange 31 is also provided at its center with a spline coupled portion 33 which is spline coupled to the cylindrical shaft portion 40, and at its intermediate portion with a doughnut-shaped disk portion 34 which connects the yoke support 32 and the spline coupled portion 33 with each other. The yoke support 32, the spline coupled portion 33 and the doughnut-shaped disk portion 34 are integrally molded. The yoke support 32 is disposed on the outer periphery of the doughnut-shaped disk portion 34, and has an L-shaped cross section which is in parallel to its axis. The rotor yoke 35 having a square cross section is fixed to the yoke support 32 through a plurality of bolts 37a and nuts 37b. A plurality of bolt insertion holes 32a and 35a are respectively formed in the yoke support 32 and the rotor yoke 35 through which the bolts 37a are inserted.

The spline coupled portion 33 is formed at the central portion of the rotor flange 31. The spline coupled portion 33 is formed with a plurality of spline tooth 33a arranged in parallel to the axial direction on the entire circumference of the inner peripheral surface of a hole penetrating a central portion having a necessary length in the axial direction. The spline tooth 33a is spline coupled to a first external tooth spline 41 formed on the central outer peripheral surface of the cylindrical shaft portion 40.

Figure 6:
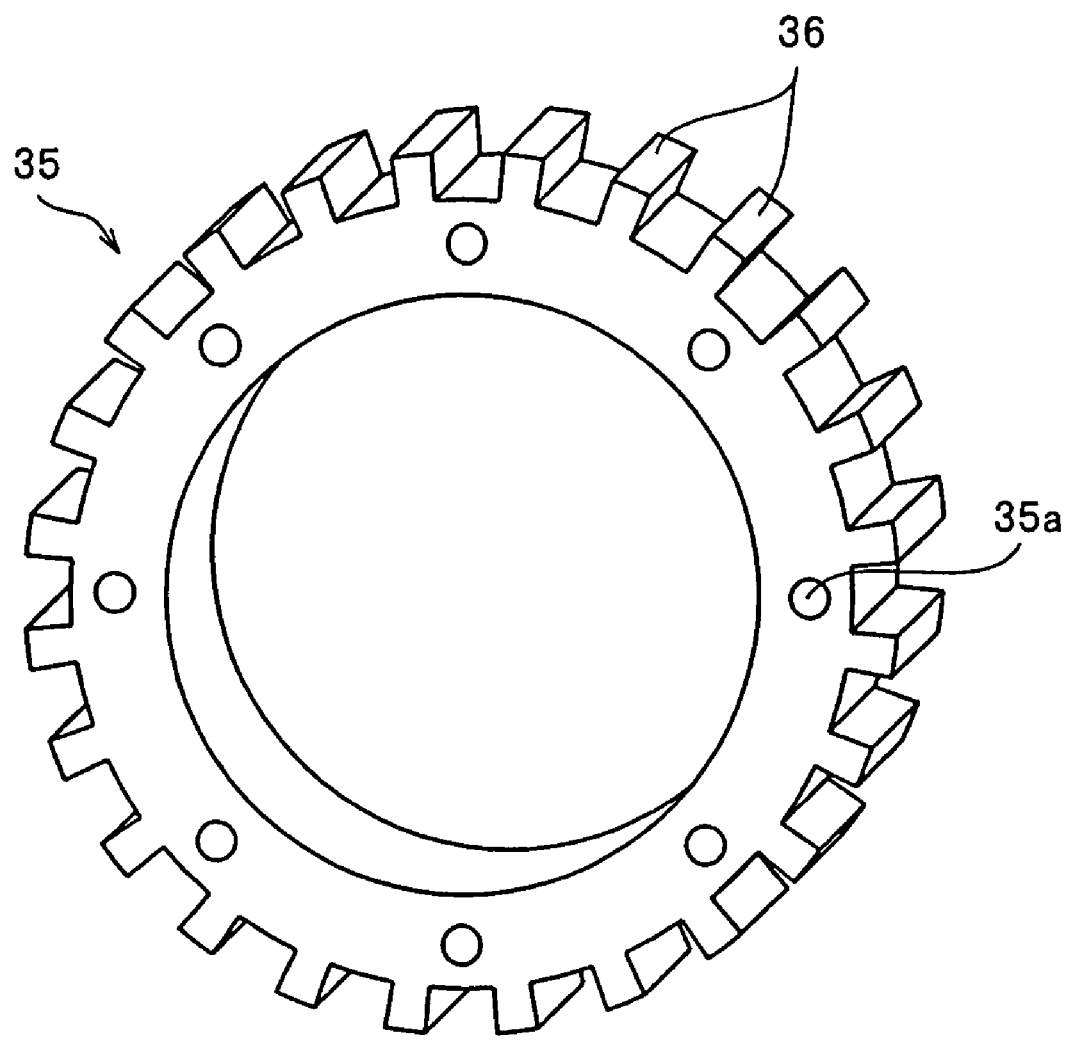
FIG. 6 is a perspective view of a rotor core of the motor rotor.
Figure 7:
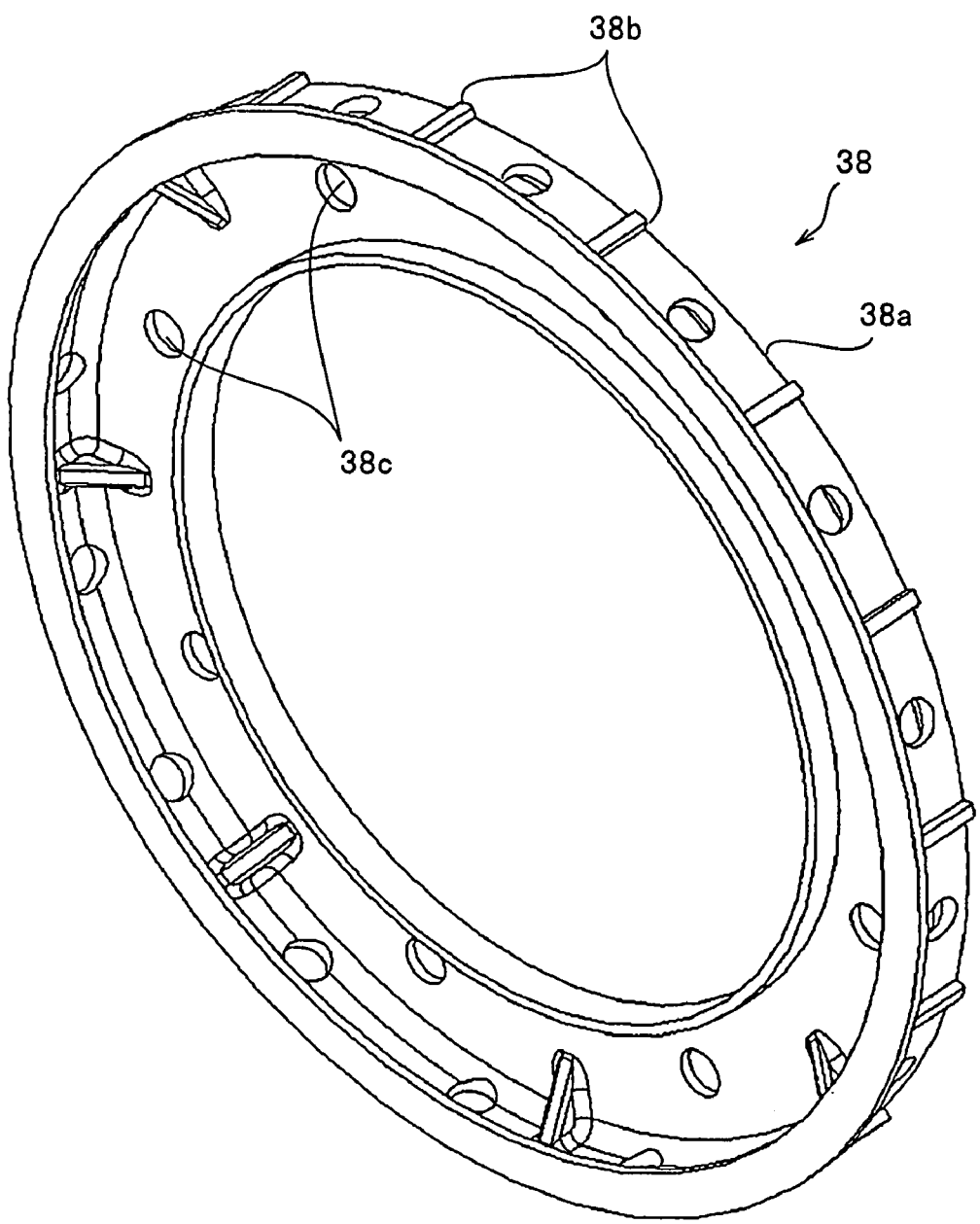
FIG. 7 is a perspective view of an impeller mounted on the rotor core.

As shown in FIG. 6, a large number of inductors 36 project from an outer peripheral surface of the ring-shaped rotor yoke 35 in its circumferential direction at predetermined pitches from one another, and an inner peripheral surface thereof is fitted over an outer peripheral surface of the rotor flange 31. In this embodiment, the total number of projections 21 projecting from the inner peripheral surface of the stator core 20 and constituting the magnetic pole is 36, the number of inductors 36 of the rotor yoke 35 is 24, and there is a pitch difference between the magnetic pole (projections 21) of the stator core 20 and the inductors 36 opposed to the rotor yoke 35.

In this embodiment, the numbers of the bolt insertion holes 32a and 35a of the yoke support 32 and the rotor yoke 35 are eight. At that time, the ring-shaped impeller 38 (shown in FIG. 7) is integrally fastened to an end surface of the rotor yoke 35 on the side of the engine and an end surface of the rotor yoke 35 on the side of the pump by means of bolts 37a and nuts 37b at the same time. Cooling oil flows downward from the cooling oil supply openings 11a and 11b formed in the upper wall of the motor housing 10. The impeller 38 receives the cooling oil in its peripheral surface, and holds the cooling oil using 16 projections (blades) 38b projecting from the outer peripheral surface in the circumferential direction at a predetermined pitch, and radially and equally sprays the cooling oil toward a inner side half entire surface of an end of the coil 23 wound around the stator core 20 disposed on the peripheral side using a centrifugal force during rotation, thereby enhancing the cooling efficiency. A body 38a of the impeller 38 is formed with eight bolt insertion holes 38c through which the bolts 37a are inserted like the bolt insertion holes 32a and 35a of the yoke support 32 and the rotor yoke 35.

Figure 8:
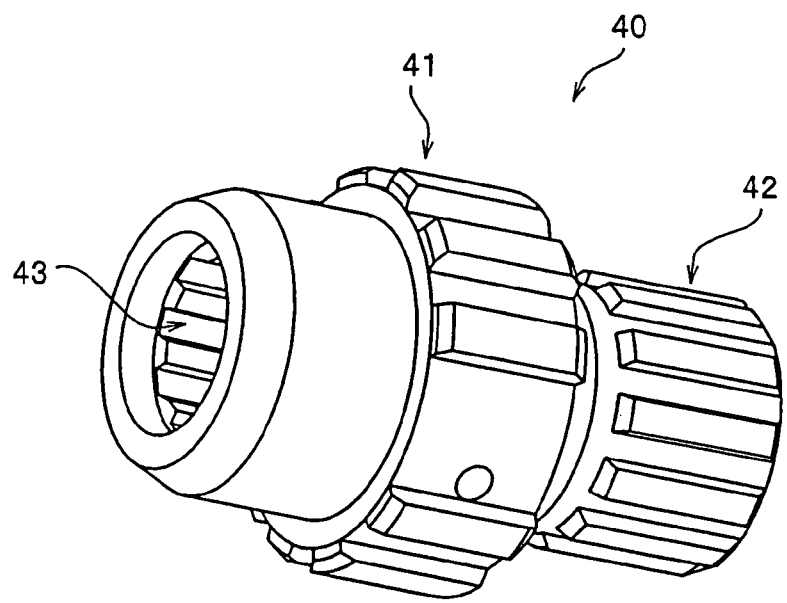
FIG. 8 is a perspective view of a cylindrical shaft portion which is one of important constituent members of the invention as viewed from the pump.
Figure 9:
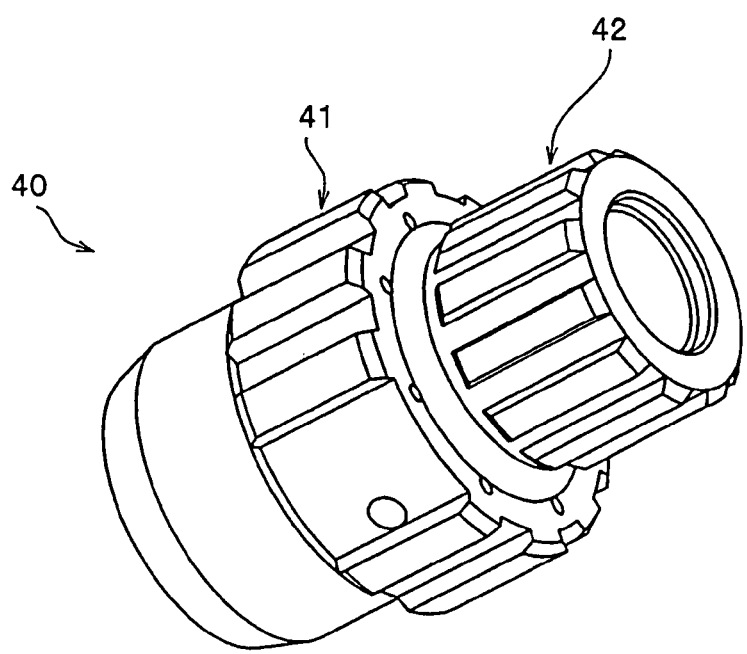
FIG. 9 is a perspective view of the cylindrical shaft portion as viewed from the engine.

As shown in FIGS. 1, 8 and 9, the cylindrical shaft portion 40 of the embodiment comprises a single shaft member, and is sequentially reduced in diameter in the order of a central portion, a pump-side end and an engine-side end with steps interposed therebetween. The cylindrical shaft portion 40 is formed at its central outer periphery with the first external tooth spline 41 which is spline coupled to the spline coupled portion 33 of the motor rotor 30, the cylindrical shaft portion 40 is formed at its engine-side end outer peripheral surface having the smallest diameter with a second external tooth spline 42 which is spline coupled to the crankshaft 1 of the engine, the cylindrical shaft portion 40 is formed at its pump-side end having an intermediate diameter with a first internal tooth spline 43 which is spline coupled to the input shaft 2 of the hydraulic pump. The engine-side end is solid. Therefore, in this embodiment, the crankshaft 1 of the engine is formed at its center portion with the internal tooth spline 1a, the external tooth spline 2a is formed in the outer peripheral surface of the input shaft 2 of the hydraulic pump, and they and the ends of the cylindrical shaft portion 40 are respectively spline coupled.

Figure 10:
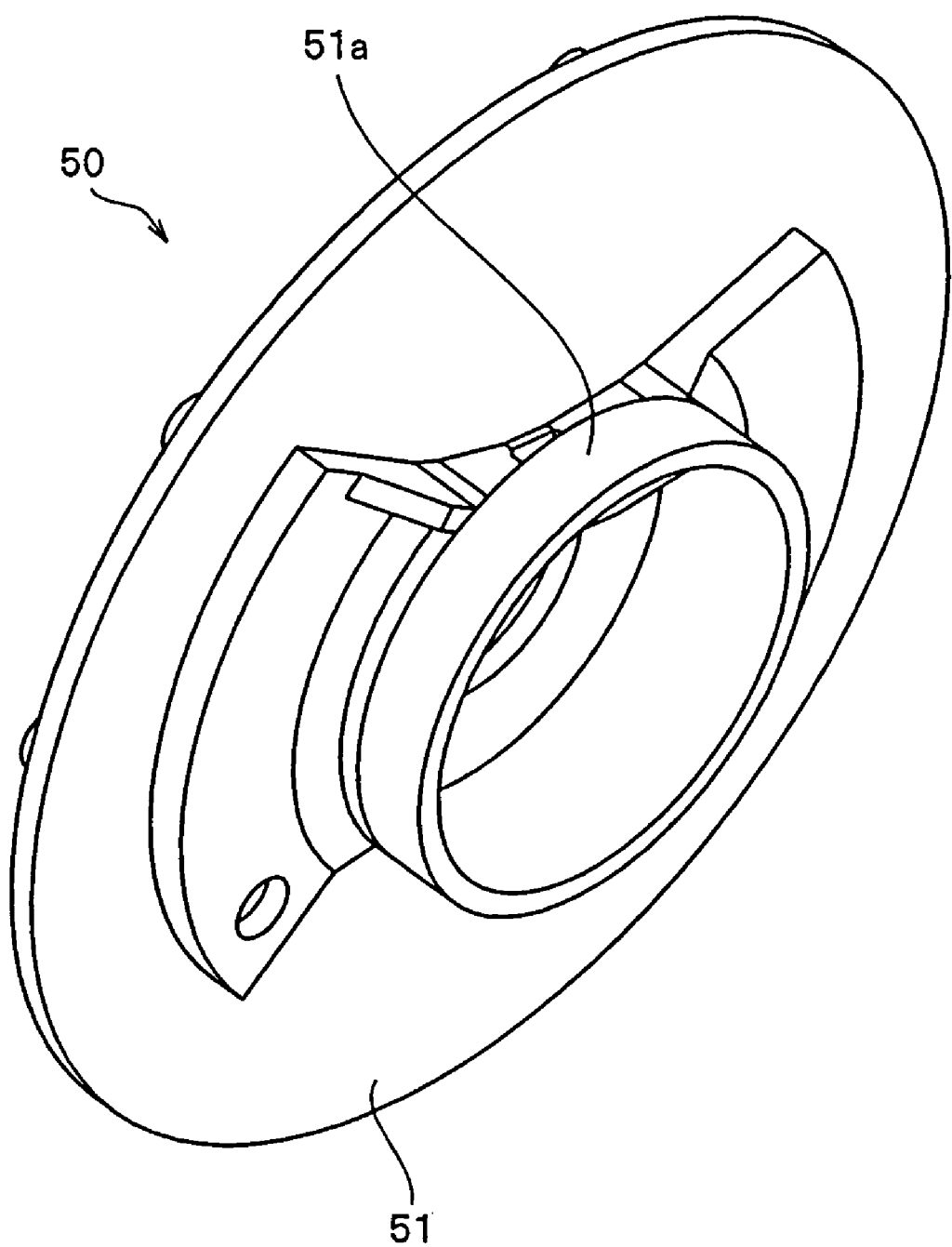
FIG. 10 is a perspective view of a bearing flange which is one of constituent members of the motor housing as viewed from the engine.

A ring-shaped flange 19 integrally extends from the pump-side end surface of the motor housing 11 toward its center, and an outer periphery of the annular bearing flange 50 is integrally fixed to an inner periphery of the ring-shaped flange 19. As shown in FIGS. 1 and 10, the bearing flange 50 has vertically long L-shaped vertical cross section. Its outer periphery is fitted into a notch which is formed in an outer surface of the inner periphery of the ring-shaped flange 19 and which is continuous in the circumferential direction, and the outer periphery is fastened and fixed by means of a plurality of bolts and nuts. Although the ring-shaped flange 19 and the bearing flange 50 are formed as independent members in this embodiment, it is also possible to integrally form the ring-shaped flange 19 and the bearing flange 50 when the motor housing 10 is manufactured. That is, the bearing flange 50 is one of constituent members of the motor housing 10.

An inner periphery portion of the bearing flange 50 extends toward the engine in parallel to the axis to constitute the bearing support member 51. The bearing support surface 51a of the bearing support member 51 which supports the inner race 61 of the bearing 60 is an inner peripheral surface of the bearing support member 51 as shown in FIG. 1. An outer race 62 of the bearing 60 is fixed to and supported by a bearing support surface 32b formed on the inner peripheral surface of the yoke support 32 on the side of the pump formed on the outer periphery of the motor rotor 30. In the present invention, the outer periphery of the motor rotor 30 is rotatably supported by a portion of the motor housing 10 comprising a rigid body through a bearing 60 without fixing a center of the motor rotor 30 such that the center integrally rotates with a normal rotation shaft, and this is equal to a configuration that a rotation center of the motor rotor 30 is fixed, the rotation center is spline coupled to the cylindrical shaft portion 40 which can transmit rotation on the side of the engine and rotation on the side of the pump in a reversible manner, and this is extremely effective structure for enhancing the rotation precision of the motor rotor 30.

Procedure for assembling the constituent members of the generator/motor having the above-described structure into the engine and the hydraulic pump or a transmission will be explained concretely. The bearing 60 is fixed between the bearing support member 51 of the bearing flange 50 and the bearing support surface 32b of the rotor flange 31. An outer periphery of the bearing flange 50 which is integrally formed on the rotor flange 31 through the bearing 60 is fixed to an inner peripheral edge of the ring-shaped flange 19 of the motor housing 10 by means of a bolt and a nut. At that time, the stator core 20 around which three coils 23 are wound has already been fixed to the inner peripheral surface of the motor housing 10. The first external tooth spline 41 formed on the central outer periphery of the cylindrical shaft portion 40 is fitted to the spline coupled portion 33 formed on the center of the rotor flange 31 and at the same time, the second external tooth spline 42 formed on the end of the cylindrical shaft portion 40 is inserted to the internal tooth spline 1a formed on the crankshaft 1. Then, the first internal tooth spline 43 formed on the end of the cylindrical shaft portion 40 on opposite side from the second external tooth spline 42 and the external tooth spline 2a formed on the other end of the input shaft 2 of the hydraulic pump or the transmission are spline coupled and then, the hydraulic pump or a housing PH of the transmission is fixed to the motor housing 10 by means of a bolt, and the assembling operation is completed.

In the generator/motor of the present invention incorporated between the engine and the hydraulic pump or the transmission, the motor rotor 30 is spline coupled and supported by the cylindrical shaft portion 40 which is disposed and spline coupled between the crankshaft 1 of the engine and the input shaft 2 of the hydraulic pump or the transmission, and the rotor flange 31 of the motor rotor 30 is strongly supported by the bearing flange 50 of the motor housing 10 through the bearing 60. As a result, the bearing 60 does not easily receive torque variation directly from the engine and thus, the lifetime of the bearing 60 can be increased and its maintenance operation becomes easy.

The motor rotor 30 whose rotation center is secured by the bearing 60 is connected, through two-stage spline coupling, to the crankshaft 1 which most vibrates when the engine rotates. Therefore, influence caused by vibration of the crankshaft 1 becomes extremely small, and the motor rotor 30 rotates precisely without wobbling almost at all. The air gap between the stator core 20 fixed to the motor housing 10 and the rotor core 35 fixed to the rotor flange 31 is maintained constant by the precise rotation, and desired power generating efficiency and motor efficiency can be obtained.

Figure 11:
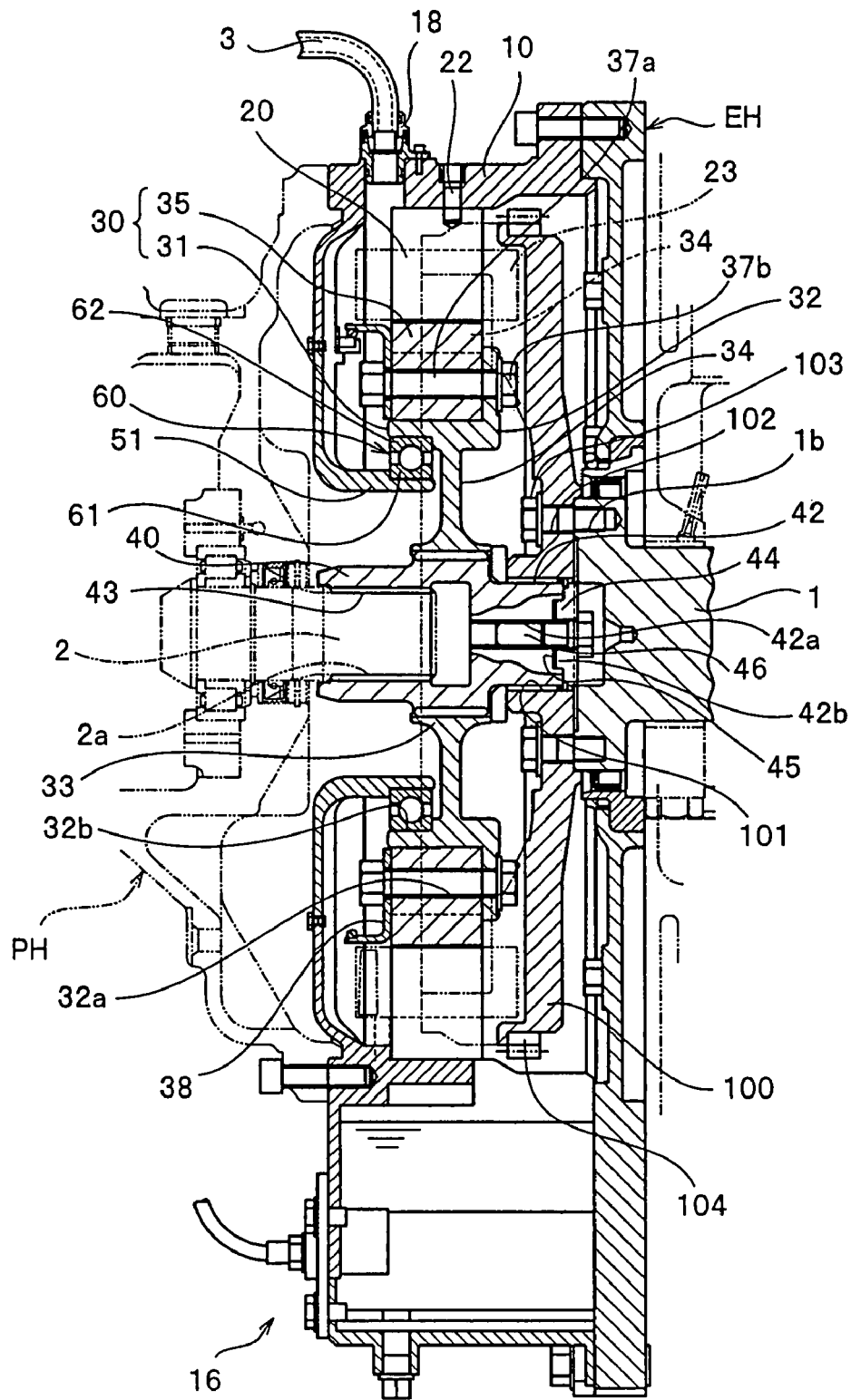
FIG. 11 is a vertical sectional view of a generator/motor mounted in a hybrid engine according to a second embodiment of the invention.

FIG. 11 shows a second embodiment of the invention. A generator/motor according to this second embodiment is different from the generator/motor of the first embodiment in that a flywheel 100 which is not included in the first embodiment is fixed to the crankshaft 1 of the engine. A starter ring gear 104 is fixed to an outer periphery of the flywheel 100. The flywheel 100 not only enhances the rotation efficiency of the engine, but also enhances the power generating efficiency of the generator/motor and the motor efficiency according to the present invention. The flywheel 100 is a constituent member on the side of the engine and is a constituent member of the generator/motor of the invention. The starter ring gear 104 fixed to the outer periphery of the flywheel has a function as a starter-starting gear, but the generator/motor has a function as a motor for starting the engine, the starter ring gear 104 itself has a function as the starter, and in order to enhance the starting performance in a cold region, it is more preferable to separately dispose a conventional starter and to use both the starters.

In this embodiment, the flywheel 100 is formed at its center with an internal tooth spline 101 instead of the internal tooth spline 1a formed on the crankshaft in the first embodiment, and the internal tooth spline 101 and the second external tooth spline 42 of the cylindrical shaft portion 40 are spline coupled to each other. Thus, a structure of coupled portions between the internal tooth spline 101 of the flywheel 100 and the second external tooth spline 42 of the cylindrical shaft portion 40 are slightly different. Other structure of the second embodiment is substantially the same as that of the first embodiment. Therefore, members of the second embodiment which are different from those of the first embodiment are designated with different symbols but substantially the same members are designated with the same symbols and names.

The internal tooth spline 101 is formed on a central portion of the flywheel 100. The second external tooth spline 42 formed on an engine-side end of the cylindrical shaft portion 40 is fitted to and spline coupled to the internal tooth spline 101. With the spline coupling only, the cylindrical shaft portion 40 moves in the axial direction with respect to the flywheel 100. In this embodiment, a screw hole 42a is formed in a shaft center of the engine-side end of the cylindrical shaft portion 40, a retainer 44 having a step is fitted into a circular recess 42b formed in the shaft end surface through a spring ring 45, and the retainer 44 having the step is fixed to the shaft end surface of the cylindrical shaft portion 40 by a fastening bolt 46. At that time, the outer peripheral end edge of the spring ring 45 is fitted into a ring-shaped groove formed in an inner peripheral surface of the internal tooth spline 101 of the flywheel, thereby preventing the cylindrical shaft portion 40 and the flywheel 100 from relatively moving with respect to each other.

A plurality of bolt insertion holes 102 are formed in a periphery of the internal tooth spline 101 of the flywheel 100, fastening bolts 103 are threadedly inserted into bolt holes 1b formed in an end surface of the crankshaft 1 through the bolt insertion holes 102, and the flywheel 100 is integrally fixed to the crankshaft 1. Then, the motor rotor 30 is incorporated in the motor housing 10. The stator core 20 is fixed to an inner peripheral surface of the motor housing 10. A central inner tooth spline coupled portion 33 of the motor rotor 30 is fitted to the first external tooth spline 41 of the cylindrical shaft portion 40 and then, the motor housing 10 is fixed to the engine housing EH as in the first embodiment. Then, an external tooth spline 2a of the input shaft 2 on the pump side is fitted to the first internal tooth spline 43 formed on the shaft end of the cylindrical shaft portion 40 on the opposite side from the second external tooth spline 42, and the pump housing PH is fixed to the motor housing 10 by means of a fastening bolt.

If the above-described structure is employed, the engine rotation efficiency and the generator/motor rotation efficiency are further enhanced by the flywheel 100, and even if the surface and core of the flywheel 100 fixed to the crankshaft 1 vibrate when the engine rotates, influence of the surface and core vibration of the flywheel 100 when the motor rotor 30 rotates is eliminated almost at all by the first stage spine coupling between the flywheel 100 and the cylindrical shaft portion 40 and by the second stage spline coupling between the cylindrical shaft portion 40 and the motor rotor 30. Further, since the motor rotor 30 is rotatably supported by a portion of the motor housing which is a rigid body through the bearing 60, the rotation center of the motor rotor 30 does not move, and the rotation precision of the motor rotor 30 is further enhanced. As a result, the power generating efficiency and motor efficiency of the generator/motor of the embodiment are further enhanced.

Figure 12:
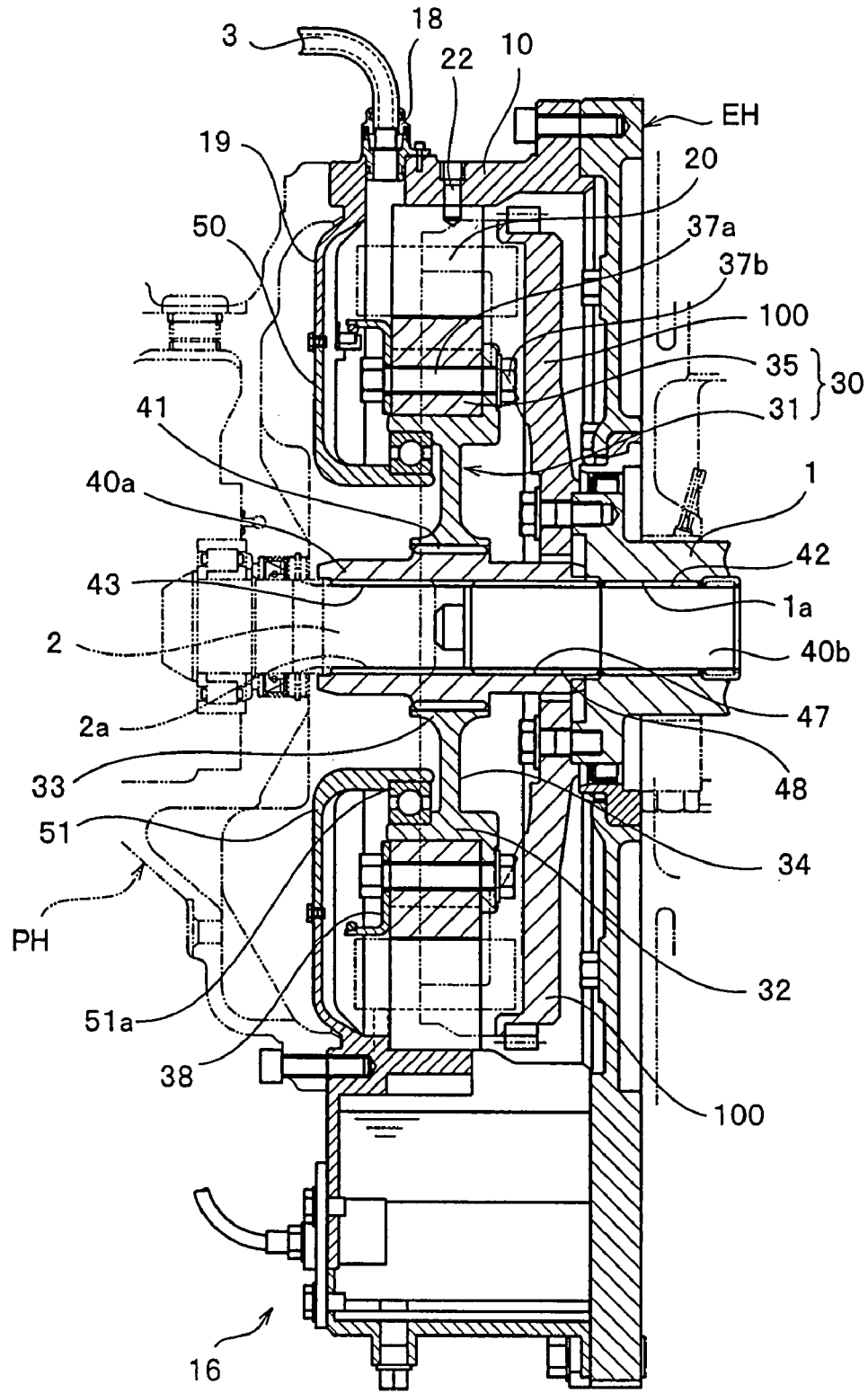
FIG. 12 is a vertical sectional view of a generator/motor mounted on a hybrid engine according to a third embodiment of the invention.

FIG. 12 shows a generator/motor according to a third embodiment of the invention. The generator/motor of the third embodiment is different from that of the first embodiment in that the flywheel 100 is fixed to the crankshaft 1 as in the second embodiment, and the generator/motor of the third embodiment is different from that of the second embodiment in that the cylindrical shaft portion 40 comprises a first shaft body 40a and a second shaft body 40b.

The first shaft body 40a of the third embodiment is different from the cylindrical shaft portion 40 of the first and second embodiments only in a partial structure thereof, and these structures are almost the same. That is, the first shaft body 40a is provided at its central portion with a first external tooth spline 41, and at its shaft end on the side of the pump with a first internal tooth spline 43 which is spline coupled to an input shaft 2 of the hydraulic pump or the transmission. The first shaft body 40a of the third embodiment is different from the cylindrical shaft portion 40 of the first and second embodiments in that the first shaft body 40a is hollow over its entire length, the shaft end of the first shaft body 40a on the side of the engine is formed with a second internal tooth spline 47 which is spline coupled to a third external tooth spline 48 formed on a shaft end of the second shaft body 40b on the side of the pump, and the engine-side shaft end and the shaft end on the side of the hydraulic pump or the transmission have the same diameters.

The second shaft body 40b is a round rod having the same diameter over its entire length, and its shaft end on the pump side is formed with a third external tooth spline 48 to be spline coupled to a second internal tooth spline 47 formed on a shaft end of the first shaft body 40a on the side of the engine. A shaft end of the second shaft body 40b on the side of the engine is also formed with an external tooth spline to be spline coupled to the internal tooth spline 1a formed at a center portion of the crankshaft 1 of the engine as in the first embodiment. The external tooth spline is substantially the same as the second external tooth spline 42 of the first embodiment. The crankshaft 1 and the first shaft body 40a are spline coupled to each other through both ends of the second shaft body 40b. At that time, in the third embodiment, splines are not formed in the central hole 104 of the flywheel 100 which is integral with the crankshaft 1, a diameter of the central hole 104 is set slightly larger than a diameter of the second shaft body 40b, and the second shaft body 40b is only loosely inserted into the central hole 104.

To incorporate the generator/motor according to the third embodiment having the above-described structure between the engine and the hydraulic pump or the transmission, as in the first and second embodiments, the motor housing 10 and the motor rotor 30 are previously formed integral with each other through the bearing 60 and then, the first external tooth spline 41 of the first shaft body 40a is fitted into and spline coupled to the spline coupled portion 33 formed with the internal tooth spline formed in the center of the motor rotor 30. The second external tooth spline 42 of the shaft end of the second shaft body 40b on the side of the engine is fitted to the internal tooth spline 1a of the crankshaft 1. Next, the third external tooth spline 48 formed on the shaft end of the second shaft body 40b on the side of the pump is fitted to and spline coupled to the second internal tooth spline 47 formed on the shaft end of the first shaft body 40a on the side of the engine and in this state, the motor housing 10 is fixed to the engine housing EH by the fastening bolt. Then, the external tooth spline 2a of the input shaft 2 of the pressure pump or the transmission is spline coupled to the first internal tooth spline 43 of the shaft end of the first shaft body on the side of the pump, the pump housing PH is fixed to the motor housing 10 by the fastening bolt and the assembling operation is completed.

With the above-described structure, the crankshaft 1 and the motor rotor 30 are spline coupled to each other by means of three stage splines through the first and second shaft bodies 40a and 40b, and direct connection between the motor rotor 30 and the flywheel 100 is eliminated. Thus, vibration such as surface and core vibration of the flywheel 100 is not easily transmitted, the rotation precision of the motor rotor 30 is further enhanced, and the power generating efficiency and motor efficiency of the generator/motor can be enhanced to the utmost.

Figure 13:
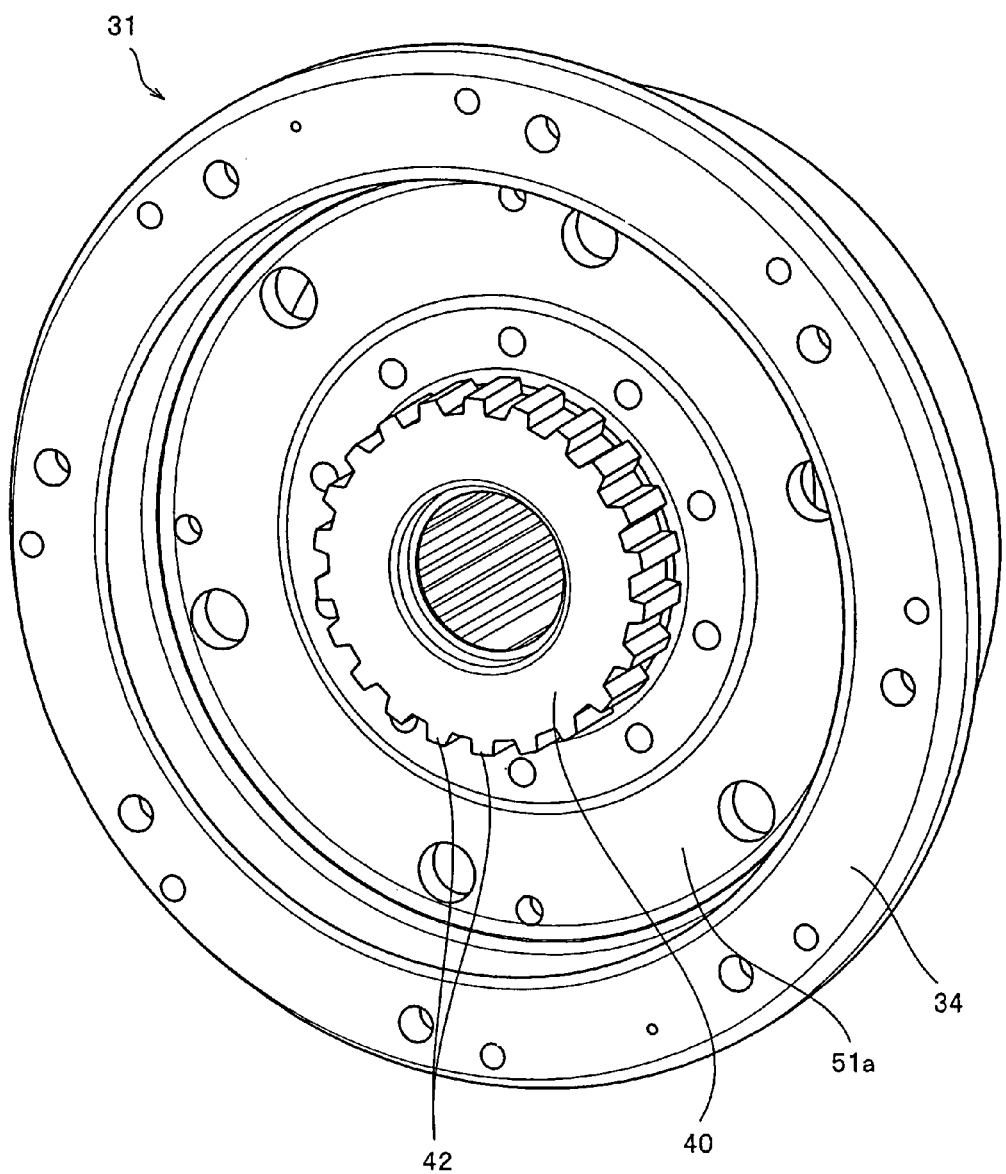
FIG. 13 is a perspective view of a rotor flange applied to a generator/motor according to a fourth embodiment of the invention as viewed from the engine.
Figure 14:
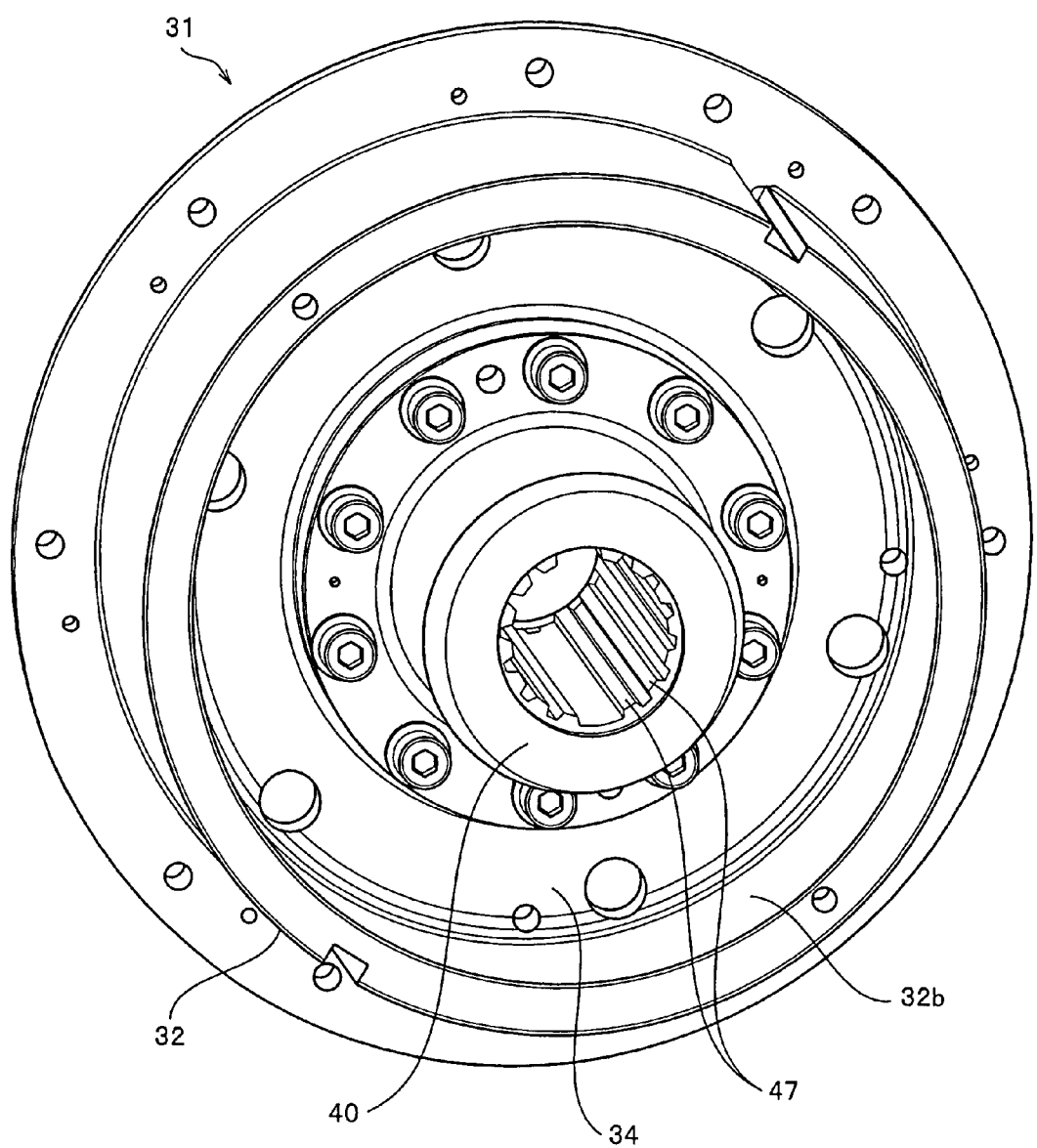
FIG. 14 is a perspective view of the rotor flange as viewed from the pump.
Figure 15:
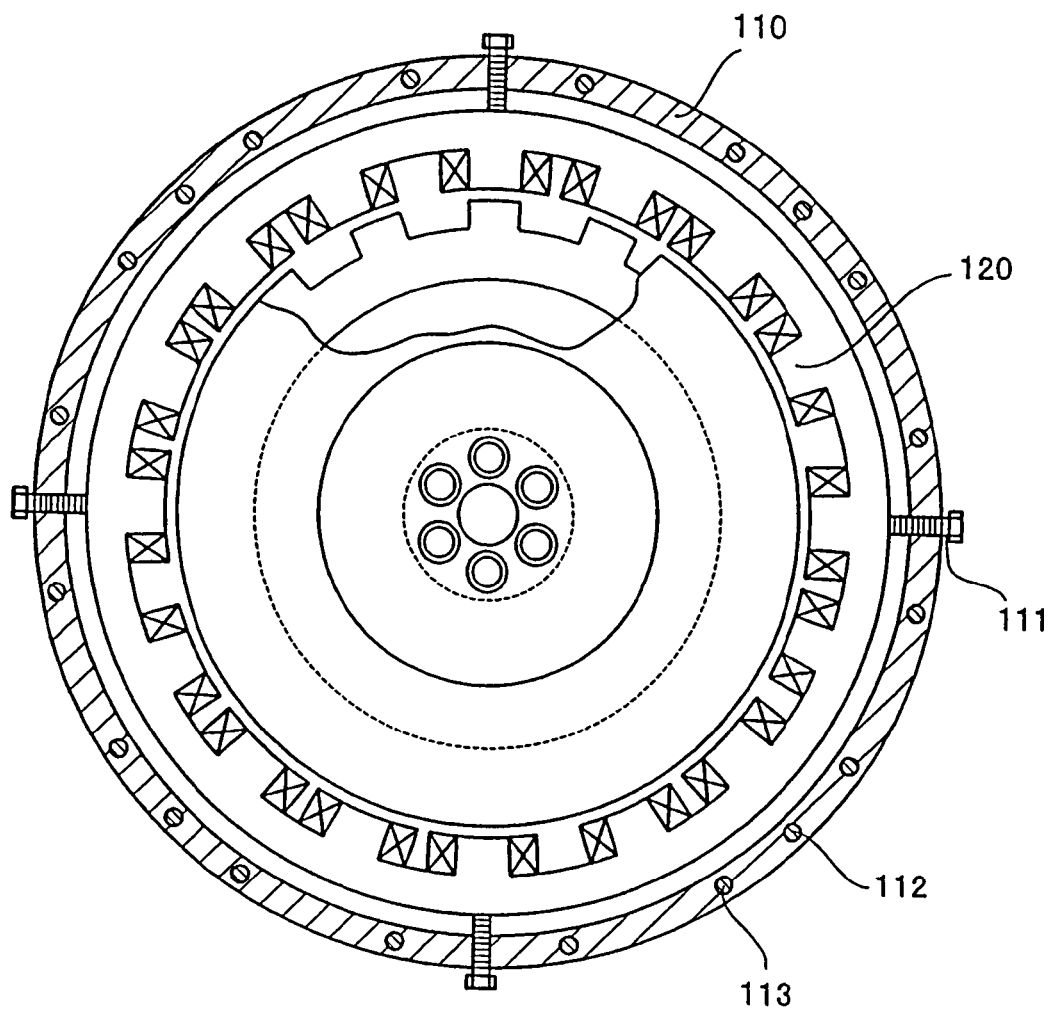
FIG. 15 is a partially cut-away front view of a generator/motor mounted in a conventional hybrid engine.
Figure 16:
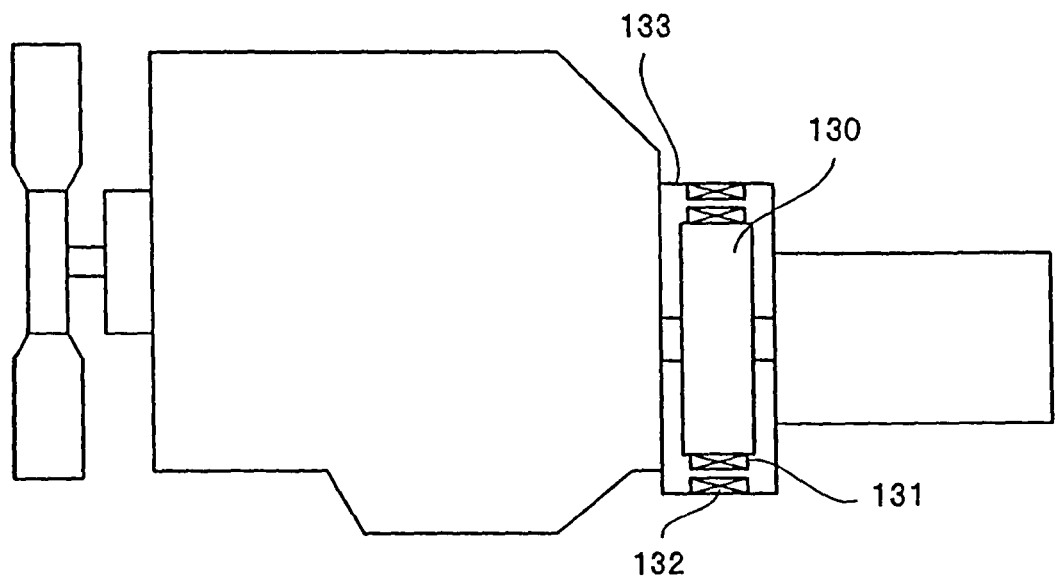
FIG. 16 is a schematic explanatory diagram of a power unit of a conventional hybrid construction equipment.

FIGS. 13 and 14 show a rotor flange applied to a generator/motor according to a fourth embodiment of the present invention, FIG. 13 is a perspective view of the rotor flange as viewed from the engine and FIG. 14 is a perspective view thereof as viewed from the pump.

In the first to third embodiments, the rotor flange 31 and the cylindrical shaft portion 40 are separately manufactured, and they are spline coupled to each other by means of the internal tooth splines and the external tooth splines. In the fourth embodiment, the rotor flange 31 and the cylindrical shaft portion 40 are integrally manufactured by molding. In the generator/motor of the hybrid engine of the invention, the motor rotor 30 is rotatably supported by the yoke support 32 of the motor housing 10 which is a rigid body through the bearing 60. As a result, surface vibration or core vibration is not generated in the rotation of the motor rotor 30. Corresponding structures of the first to third embodiments can be employed as the other structure of the fourth embodiment. Thus, members corresponding to those in the first to third embodiments are designated with the same symbols in FIGS. 13 and 14.

The rotor flange 31 and the cylindrical shaft portion 40 of the fourth embodiment are integrally formed as described above, and a large number of first internal tooth splines 43 which are to be spline coupled in part to an input shaft on the side of the pump (not shown) are formed on an inner peripheral surface of the cylindrical shaft portion 40 which directly projects from left and right surfaces of the central portion of the rotor flange 31 in parallel to the axis along its entire length. An outer peripheral surface of the shaft of the cylindrical shaft portion 40 projecting toward the engine-side end is flat, and second external tooth splines 42 to be spline coupled to the internal tooth splines formed on the crankshaft of the engine (not shown) are formed on the outer peripheral surface of the shaft of the cylindrical shaft portion 40 projecting toward the engine-side end.

In this embodiment also, the cylindrical shaft portion 40 is interposed between the motor rotor 30 and the crankshaft of the engine. In this embodiment, however, the rotor flange 31 and the cylindrical shaft portion 40 are integrally formed. The cylindrical shaft portion 40 and the crankshaft are spline coupled to each other as in the first to third embodiments. Thus, vibration of the crankshaft is not transmitted directly to the motor rotor 30. With such spline coupling, the machining precision can easily be adjusted depending upon design of the meshing tooth.

According to this embodiment also, the cylindrical shaft portion 40 and the crankshaft are spline coupled to each other with a fine clearance therebetween so that a free degree is given to the fitted portions. With this clearance, even if the crankshaft receives vibration of the engine and the core vibrates, the core vibration is attenuated through the intermediate shaft, the rotation precision of the motor rotor is maintained for a long time, and the air gap between the stator core is maintained constant for a long term. As a result, the motor efficiency and the power generating efficiency of the generator/motor of the embodiment are not deteriorated.

The invention claimed is:

1. A generator/motor as an auxiliary power unit of an engine, the generator/motor comprising:
   a ring-shaped stator core fixed to a motor housing,
   a motor rotor rotatably supported by the motor housing, the motor rotor including:
      a ring-shaped rotor yoke which is opposed to an inner peripheral surface of the stator core at a predetermined gap therebetween,
      a rotor flange which fixes and supports the rotor yoke, and
      a cylindrical shaft portion disposed at a center of the rotor flange and transmitted rotation directly between the rotor flange,
      wherein the rotor flange is rotatably supported by a support portion of the motor housing through a bearing, and
      wherein the cylindrical shaft portion is configured at its center to transmit the rotation between the rotor flange, and is formed at its both ends with spline teeth which are disposed on a same axis respectively,
      the spline tooth formed on the one end of the cylindrical shaft portion and a region to eject rotation of the engine are spline coupled on the same axis, and
      the spline tooth formed on the other end of the cylindrical shaft portion and an input shaft of a hydraulic pump or a transmission are spline coupled on the same axis.

2. The generator/motor according to claim 1, wherein the bearing is an annular ball bearing, the rotor flange is an annular rotor flange, and the ball bearing is fixed between a bearing support portion of the motor housing and the annular rotor flange formed on the rotor yoke.

3. The generator/motor according to any one of claims 1 and 2, wherein the cylindrical shaft portion and the rotor flange are separately provided and spline coupled to each other.

4. The generator/motor according to any one of claims 1 and 2, wherein the cylindrical shaft portion and the rotor flange are integrally formed.

5. The generator/motor according to claim 3, wherein the cylindrical shaft portion includes a first shaft body and a second shaft body,
   the first shaft body is formed at its central portion with an external tooth spline which is spline coupled to the rotor flange, at its one end with an internal tooth spline which is spline coupled to an external tooth spline formed at one end of the second shaft body, and at its other end with a spline tooth which transmits the rotation of the cylindrical shaft portion to the shaft of the hydraulic pump or the transmission through spline coupling, and
   the second shaft body is formed at its one end with the external tooth spline which is spline coupled to the first shaft body, and at its other end an external tooth spline which is transmitted the rotation of the engine through spline coupling.

6. The generator/motor according to claim 5, wherein the spline tooth which is formed at the other end of the first shaft body is an internal tooth spline.

7. The generator/motor according to claim 1, further comprising a flywheel which is integrally fixed to a crankshaft of the engine, and
   rotation of the flywheel is transmitted to an external tooth spline which is formed on the one end of the cylindrical shaft portion through spline coupling.

8. The generator/motor according to claim 1, further comprising a flywheel integrally fixed to a crankshaft of the engine,
   a through hole is formed at a central portion of the flywheel,
   the cylindrical shaft portion is inserted into the through hole of the flywheel, and
   the rotation of the engine is transmitted to an external tooth spline which is formed on the one end of the cylindrical shaft portion through the spline coupling.

* * * * *